United States Patent
Gulati et al.

(10) Patent No.: US 11,828,863 B2
(45) Date of Patent: Nov. 28, 2023

(54) TIMING SYNCHRONIZATION FOR COOPERATIVE RADAR SENSING

(71) Applicant: QUALCOMM Incorporated, San Diego, CA (US)

(72) Inventors: Kapil Gulati, Belle Mead, NJ (US); Dan Zhang, San Diego, CA (US); Junyi Li, Franklin Park, NJ (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/198,035

(22) Filed: Mar. 10, 2021

(65) Prior Publication Data
US 2022/0291325 A1 Sep. 15, 2022

(51) Int. Cl.
*G01S 19/10* (2010.01)
*G01S 5/02* (2010.01)
*G01S 13/08* (2006.01)
*G01S 13/58* (2006.01)
*G01S 13/72* (2006.01)

(52) U.S. Cl.
CPC .......... *G01S 5/02216* (2020.05); *G01S 13/08* (2013.01); *G01S 13/58* (2013.01); *G01S 19/10* (2013.01); *G01S 13/72* (2013.01)

(58) Field of Classification Search
None
See application file for complete search history.

(56) References Cited

U.S. PATENT DOCUMENTS

| 10,798,529 B1* | 10/2020 | Beg .......................... G01V 9/00 |
| 11,632,281 B1* | 4/2023 | Arslan ..................... H04B 1/69 |
| | | 375/139 |
| 2010/0207804 A1* | 8/2010 | Hayward .............. G01S 13/003 |
| | | 342/28 |
| 2012/0032855 A1* | 2/2012 | Reede ..................... G01S 13/82 |
| | | 370/252 |
| 2012/0056772 A1* | 3/2012 | Jaffer ..................... G01S 13/003 |
| | | 342/99 |
| 2017/0029107 A1* | 2/2017 | Emami ................. G01S 13/003 |
| 2019/0107614 A1* | 4/2019 | Dobrev ................... G01S 7/352 |
| 2020/0003885 A1* | 1/2020 | Choi ........................ G01S 13/89 |

(Continued)

OTHER PUBLICATIONS

Qin Tao et al ("Intelligent Reflecting Surface Aided Multicasting with Random Passive Beamforming", arxiv.org, Cornell University Library, 201 Olin Library Cornell University Ithaca, NY 14853, Sep. 1, 2020 (Sep. 1, 2020), XP081753190) (Year: 2020).*

*Primary Examiner* — Timothy A Brainard
*Assistant Examiner* — Hailey R Le
(74) *Attorney, Agent, or Firm* — Procopio, Cory, Hargreaves & Savitch LLP

(57) ABSTRACT

A configuration to determine a timing offset between a first wireless device and a second wireless device in order to synchronize timing between the first wireless device and the second wireless device. The apparatus determines a timing offset between a first wireless device and a second wireless device based on at least one transmission received from the second wireless device. The apparatus determines a location of a target device based at least on the at least one transmission from the second wireless device and the timing offset between the first wireless device and the second wireless device.

29 Claims, 10 Drawing Sheets

(56) References Cited

U.S. PATENT DOCUMENTS

2020/0033442 A1* 1/2020 Gulati ................... H04K 1/00
2020/0081090 A1* 3/2020 Marshall ............. H04W 64/003
2021/0055374 A1* 2/2021 Dokhanchi ........... G01S 13/931

* cited by examiner

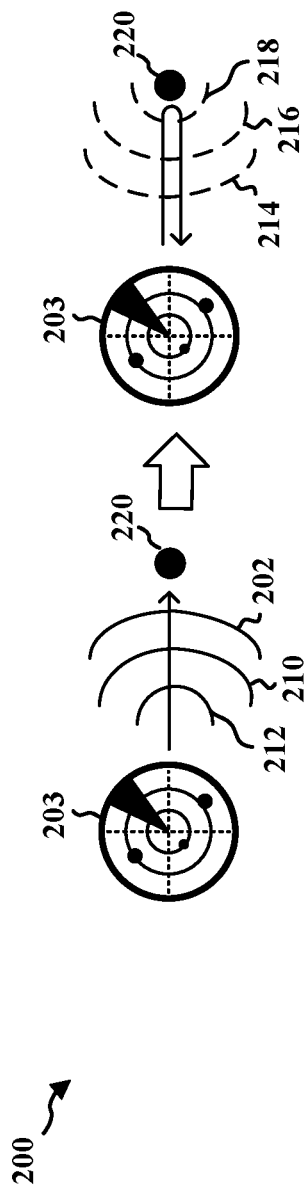
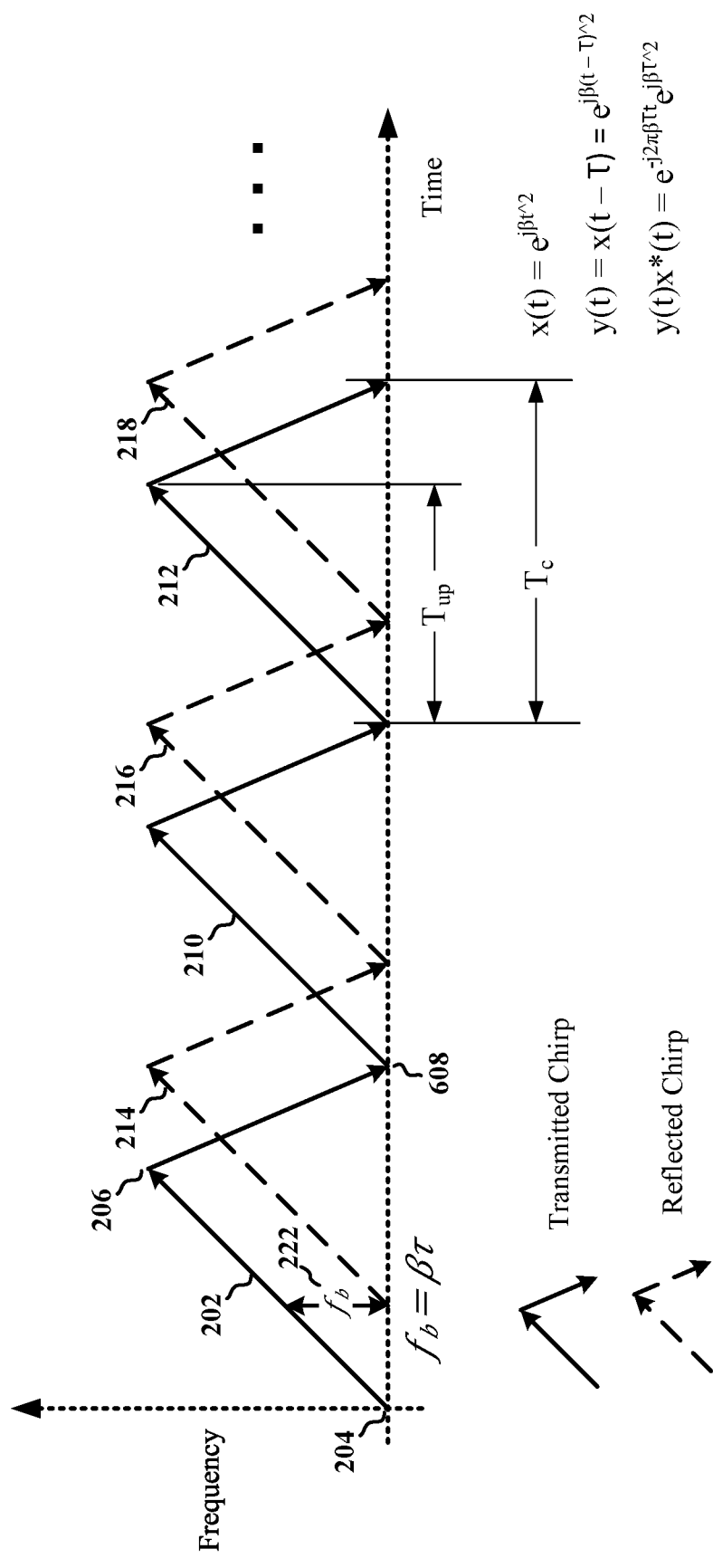
FIG. 2

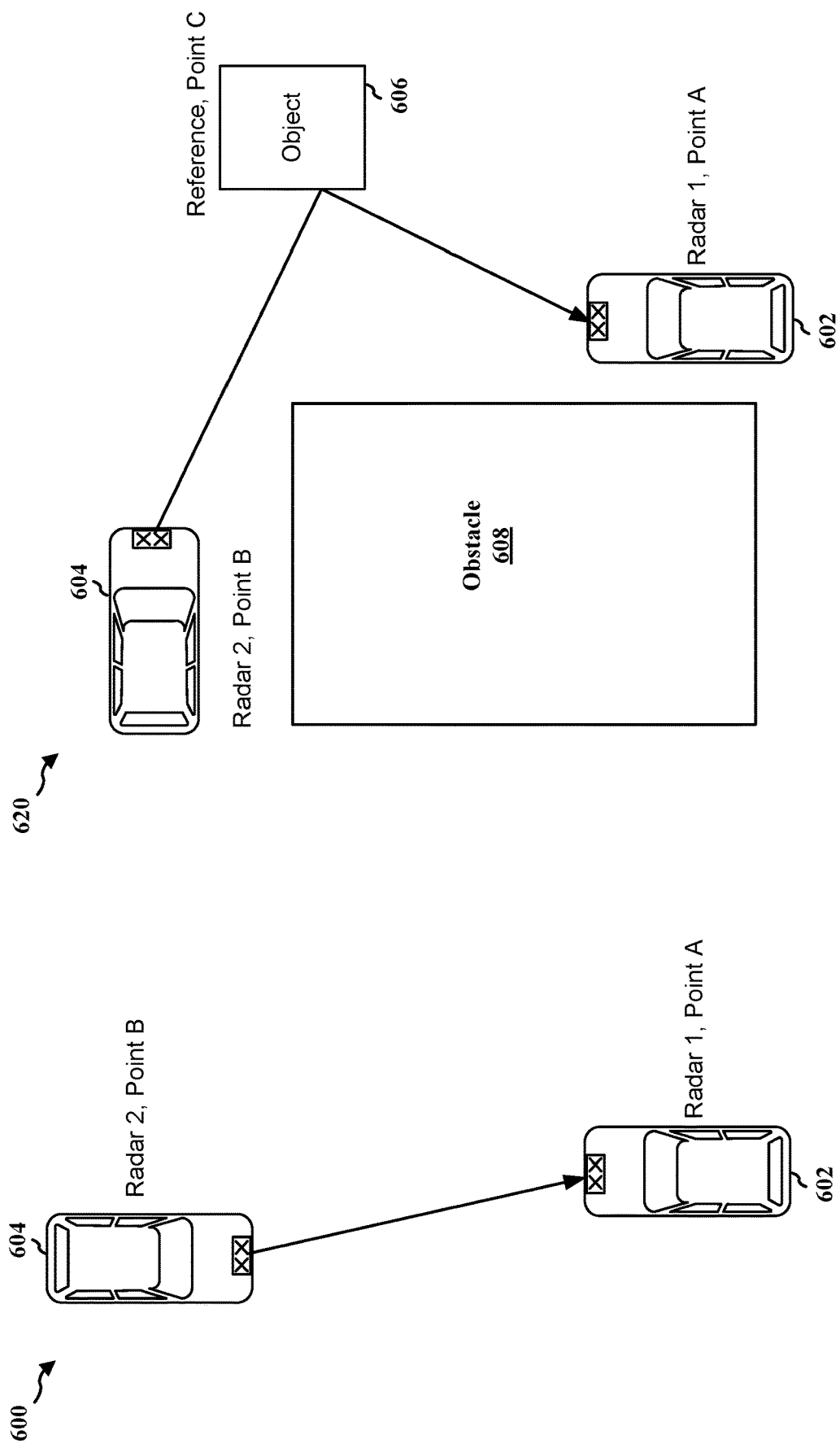

TIMING SYNCHRONIZATION FOR COOPERATIVE RADAR SENSING

INTRODUCTION

The present disclosure relates generally to radar devices, and more particularly, to configuration for timing synchronization for cooperative radar sensing.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus of a first wireless device are provided. The apparatus may be a device at a UE. The device may be a processor and/or a modem at a UE or the UE itself. The apparatus may be a radar device. The apparatus determines a timing offset between a first wireless device and a second wireless device based on at least one transmission received from the second wireless device. The apparatus determines a location of a target device based at least on the at least one transmission from the second wireless device and the timing offset between the first wireless device and the second wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2 is a diagram illustrating example aspects of a transmitted radar signal and a return signal.

FIG. 6A is a diagram illustrating an example of line of sight radar sensing.

FIG. 6B is a diagram illustrating an example of non-line of sight radar sensing.

DETAILED DESCRIPTION

Figure 1:
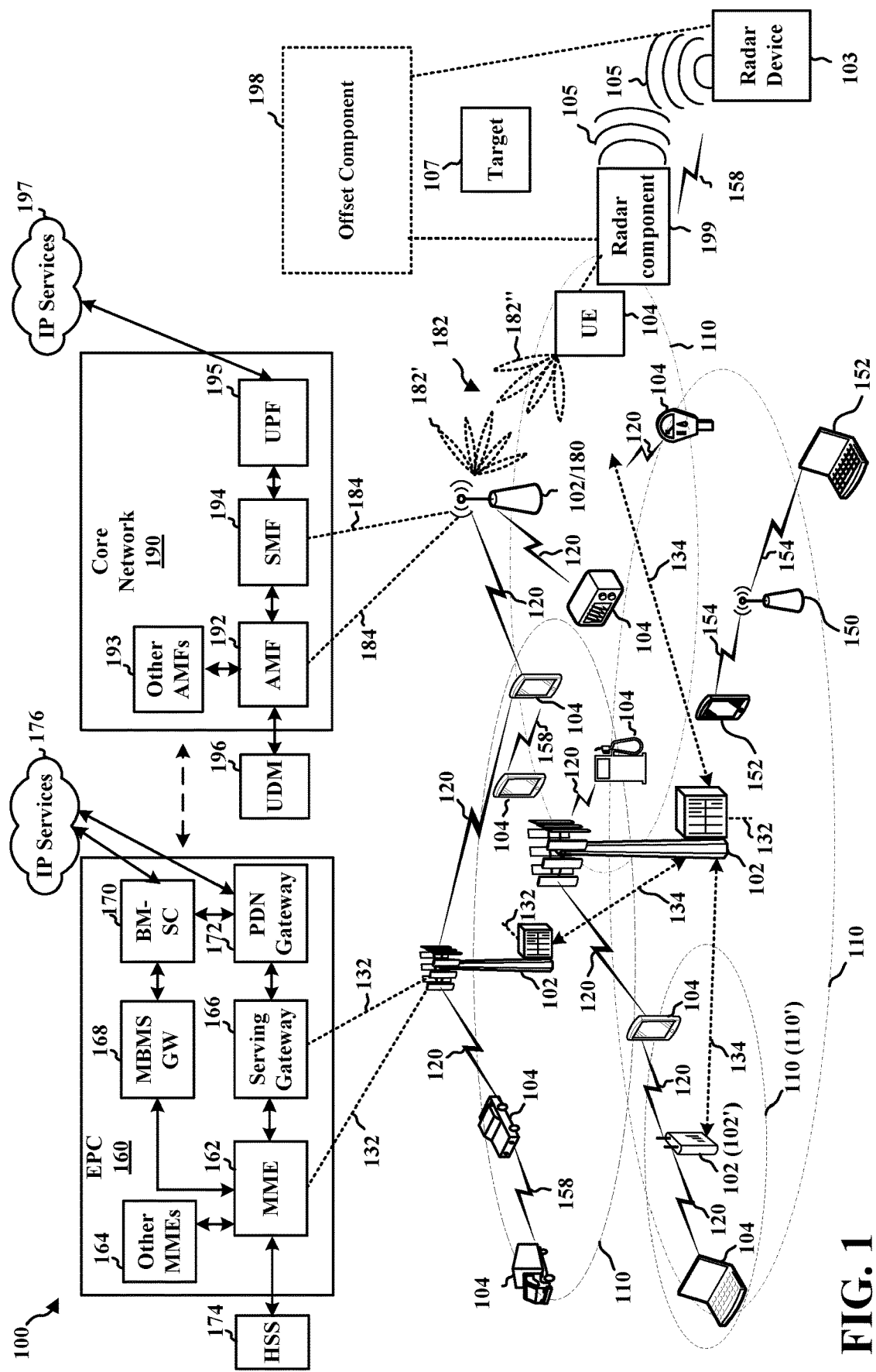
FIG. 1 is a diagram illustrating an example of a radar device and a wireless communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A ranging radar may be incorporated in equipment, such as a vehicle, for performing collision avoidance and other related techniques. Radar measurements may also be used for non-vehicular applications. The radar may be configured to transmit a radar signal/pulse and receive a return signal based on a reflection of the radar signal from an object. The radar device may determine the time delay between transmission of the radar signal and reception of the return signal in order to determine a distance between the radar and the object from which the return signal is reflected. Radar signal sensing may be employed for automotive radar, e.g., detecting an environment around a vehicle, nearby vehicles or items, detecting information for smart cruise control, collision avoidance, etc. Radar signal sensing may be employed for gesture recognition, e.g., a human activity recognition, a hand motion recognition, a facial expression recognition, a keystroke detection, sign language detection, etc. Radar signal sensing may be employed to acquire contextual information, e.g., location detection, tracking, determining directions, range estimation, etc. Radar signal sensing may be employed to image an environment, e.g., to provide a 3-dimensional (3D) map for virtual reality (VR) applications. Radar signal sensing may be employed to provide high resolution localization, e.g., for industrial Internet-of-things (IIoT) applications. In some examples, the radar device may provide consumer level radar with advanced detection capabilities. Radar signal sensing may provide touchless or device free interaction with a device or system. For example, a wireless device may detect user gestures to trigger an operation at the wireless device.

FIG. 1 is a diagram 100 illustrating an example of a wireless communications system and an access network in which base stations 102 or 180 may wirelessly communicate with user equipments (UEs) 104. Some wireless devices may perform radar signal sensing. For example, a radar device 103 may transmit a wireless signal 105 and use information about the signal to image an environment or determine information about a target 107 based on range, doppler, and/or angle information determined from the wireless signal. The signal may include a defined waveform, such as a frequency modulated continuous wave (FMCW) or a pulse or chirp waveform.

In some examples, the radar device 103 may transmit a radar signal to determine information about a target or an environment. An offset component 198 in the radar device 103 may be configured to determine a timing offset between a first wireless device and a second wireless device based on at least one transmission received from the second wireless device. In some aspects, a UE 104, or other wireless communication device may include a radar component 199 that includes the offset component 198.

In some examples, radar signal sensing may be based on frequency ranges that overlap with wireless communication systems for the radar signal 105, such as the wireless communication system illustrated in FIG. 1. The radar device 103 may use a waveform for the radar signal 105 that relates to a communication system. As one non-limiting example, radar signal sensing may be performed via a mmW signal, such as a Frequency Range2 (FR2), Frequency Range 2x (FR2x), and/or Frequency Range 4 (FR4) signal, which may provide improved range for radar signal detection. In some examples, the radar device 103 may be capable of performing radar signal sensing and wireless communication. In some examples, radar devices 103, or a wireless device having a radar component 198, may exchange wireless communication. In some examples, the devices may exchange communication over a D2D link 158, such as based on sidelink. In some examples, the radar device 103 may correspond to a UE 104, a base station 102 or 180, or other access point in the communication system of FIG. 1. In other examples, the radar device 103 may perform radar signal sensing without having wireless communication capabilities. As illustrated in FIG. 1, the radar device 103 may use beams to transmit the signal 105. The radar device 103 may be within or outside of a coverage area 110 of a base station 102 or 180.

The wireless communications system illustrated in FIG. 1 (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2 is a diagram 200 illustrating an example of the FMCW signal generated from a radar device 203 (e.g., an FWCW radar). The radar device 203 may detect a target object 220 by transmitting a chirp signal (which may also be referred to as a pulse signal), where the chirp signal may have a frequency that varies linearly (e.g., frequency sweeping) over a fixed period of time (e.g., sweep time) by a modulating signal. The transmitted signal 202 may correspond to an instantaneous frequency that increases from zero to a higher frequency and subsequently decreases from the higher frequency to zero based on a sinusoidal operation. In other words, each chirp (e.g., 202, 210, 212 (or radar pulse) may include an increase in the frequency (e.g., a linear increase) and a drop in the frequency, such that the radar device 203 may transmit chirps or pulses sweeping in frequency. Each sweep up and down of the radar signal may correspond to an individual pulse or chirp of the FMCW signal. A chirp time may be indicated by $T_c$ and a sweeping up time may be indicated by $T_{up}$. For instance, the frequency may sweep up from 77 GHz to 78 GHz to provide a sweeping bandwidth of 1 GHz. A time period that elapses for the sweeping up of the 1 GHz of bandwidth may correspond to $T_{up}$. After the radar sweeps up to 78 GHz, an additional/non-zero length of time may elapse for the radar to sweep down and return to 77 GHz. The additional/non-zero length of time may correspond to $T_{down}$. Thus, $T_{up}+T_{down}$ may equal $T_c$ (e.g., the duration of the chirp/pulse). In examples, the radar may be configured based on certain $T_c$ parameters.

After one or more chirps (e.g., 202, 210, 212) are transmitted by the radar device 203, the transmitted chirps (e.g., signals) may reach the target object 220 and reflect back to the radar device 203, such as shown by the reflected chirps 214, 216 and 218. The radar may receive a series of chirps via the return signal that match the transmitted signal, albeit delayed based on a location of an object from which the return signal is reflected. The time between the transmission of the radar signal and the reception of the reflected signal may indicate a distance to the target object 220. For example, the delay may be proportional to a range between the radar device 203 and the target object 220 (e.g., the farther the target, the larger the delay and vice versa). Thus, the radar device 203 may be able to measure or estimate the actual distance between the radar device 203 and the target object 220 based on the delay. As a distance between the radar and the object increases, the corresponding delay may become larger. The distance to the object may be determined based on the delay. For example, rather than directly measuring a time of the delay, a frequency delta between the transmitted signal 202 and the return signal 214 may be determined, where the frequency delta may be proportional to the delay. The range of the object may be further determined based on the delay being proportional to the range. The frequency delta may be associated with a range spectrum and a beat frequency ($F_b$) determined based on a Fast Fourier Transform (FFT). The beat frequency may correspond to a mixed output of the transmitted signal 202 and the return signal 214. A slope for sweeping up the frequency may be defined (e.g., 1 GHz per $T_{up}$ seconds), such that a rate at which the slope changes may correspond to a beta ($\beta$) parameter.

The parameters of the transmitted signal 202 and the return signal 214 may be indicative of a maximum (e.g., theoretical) detectable range of an FMCW receiver of the radar. For longer range radars, 100-300 m may be the maximum detectable range. The parameters may also be indicative of a maximum detectable speed/velocity (e.g., 30-40 m/s). For example, based on multiple received chirps, the velocity of the object may be determined based on a Doppler spectrum and a direction of the object may be determined based on a direction of arrival (DoA) spectrum. In examples, outputs such as $x(t)=e^{j\beta^{\wedge}2}$; $y(t)=x(t-\tau)=e^{j\beta(t-\tau)^{\wedge}}$; and/or $y(t)x^*(t)=e^{-j2\pi\beta\tau t}e^{j\beta\tau^{\wedge}2}$ may be determined based on the parameters of the FMCW waveform, where x corresponds to a transmitted chirp signal, y corresponds to a received chirp signal, t corresponds to time, j corresponds to $\sqrt{-1}$, and τ corresponds to a delay between a transmitted chirp and a received chirp. That is, three different frequency analyses may be performed to determine range, velocity, and/or direction. There may be a delay proportional to range. There may be mixer output beat frequency. An FMCW receiver (e.g., incorporated in a radar) may operate in a range spectrum and may identify beat frequency/range. With multiple chirps, the FMCW receiver may identify target velocity based on Doppler spectrum and may identify target direction based on the direction of arrival (DoA) spectrum.

Figure 3:
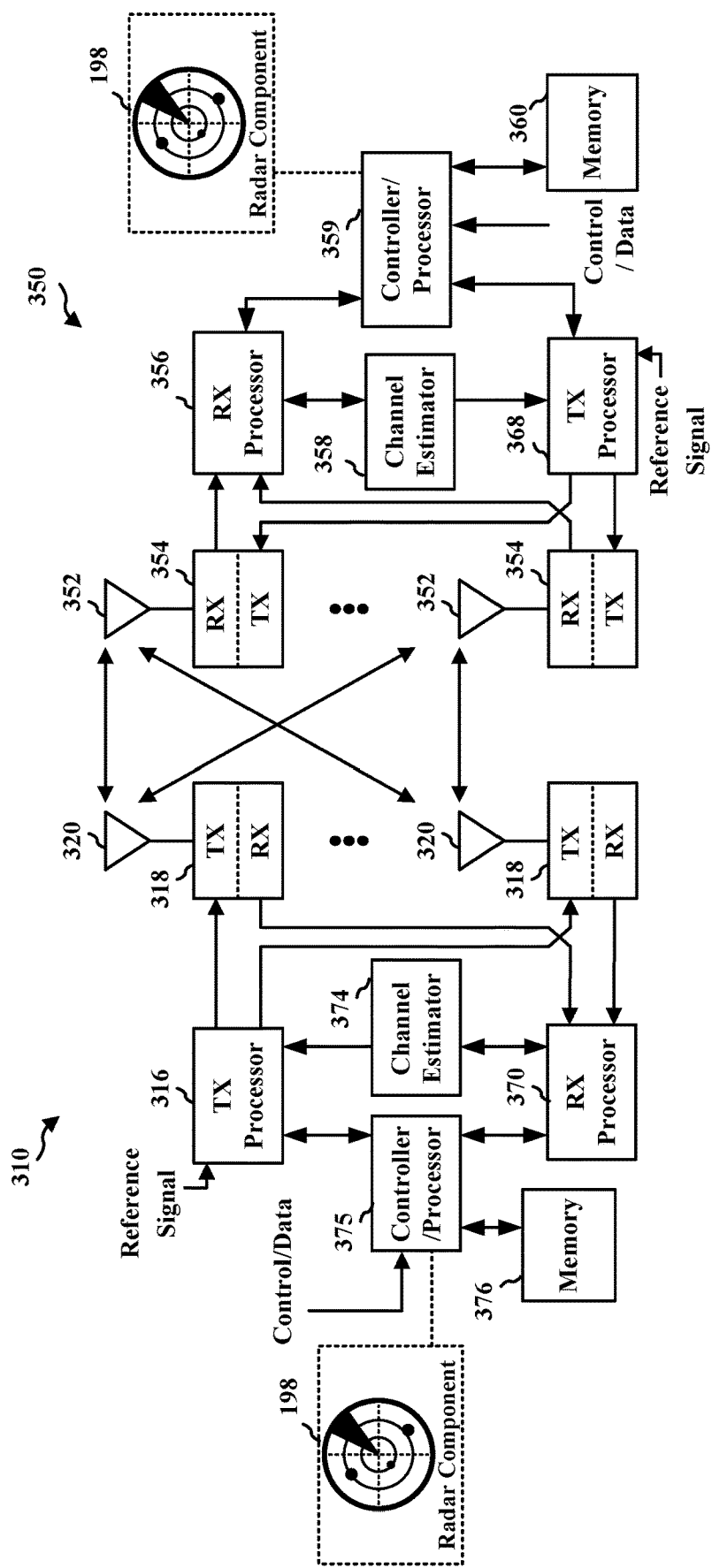
FIG. 3 is a diagram illustrating an example of a wireless device capable of sensing a radar signal.

FIG. 3 is a block diagram of a first wireless device 310 having components for wireless transmission. The wireless device 310 may be a radar device configured to perform the aspects presented herein. In some examples, the wireless device 310 may be capable of communication with another wireless device 350, e.g., based on sidelink and/or an access link, such as described in connection with FIG. 1. Example aspects of sidelink communication are described in connection with FIG. 4. The wireless device 310 may include one or more antennas 320 may include a transmitter/receiver 318 with a corresponding transmit processor 316 and receive processor 370 that are configured to perform radar transmission and measurement, such as described in connection with FIGS. 1 and 2. The one or more antenna 320, transmitter/receiver 318, transmit processor 316, and receive processor 370 may transmit a radar signal and receive reflections of the radar signal. The controller/processor 375 may determine radio frequency (RF) sensing information about a target based on the received signal. For example, the wireless device 310 or 350 may further include a radar component 199, such as described in connection with FIG. 1.

In some examples, the wireless device 310 may be capable of wireless communication in addition to RF sensing. For communication, packets may be provided to a controller/processor 375. The controller/processor 375 implements layer 3 and layer 2 functionality. The transmit (TX) processor 316 and the receive (RX) processor 370 implement layer 1 functionality associated with various signal processing functions. Different spatial streams may be provided to a different antenna 320 via a separate transmitter 4318 TX. Each transmitter 318 TX may modulate an RF carrier with a respective spatial stream for transmission.

At the wireless device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the wireless device 350. If multiple spatial streams are destined for the wireless device 350, they may be combined by the RX processor 356 into a single stream, such as an OFDM symbol stream. The RX processor 356 may convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, are recovered and demodulated by determining the most likely signal constellation points transmitted by the wireless device 310. These soft decisions may be based on channel estimates computed by the channel estimator 358. The soft decisions may then be decoded and deinterleaved to recover the data and control signals that were originally transmitted by the wireless device 310 on the physical channel. The data and control signals may then be provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing to recover IP packets from the EPC 160. The controller/processor 359 may also be responsible for error detection using an ACK and/or NACK protocol to support HARQ operations.

Channel estimates derived by a channel estimator 358 from a reference signal or feedback transmitted by the wireless device may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The received transmission may be processed at the wireless device 310 in a manner similar to that described in connection with the receiver function at the wireless device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover packets from the wireless device 350. The controller/processor 375 may also be responsible for error detection using an ACK and/or NACK protocol to support HARQ operations.

At least one of the TX processor 316, the RX processor 370, or the controller/processor 375 may be configured to perform aspects in connection with the radar signal sensing component 198 of FIG. 1 to determine a timing offset between a first wireless device and a second wireless device based on at least one transmission received from the second wireless device.

Figure 4:
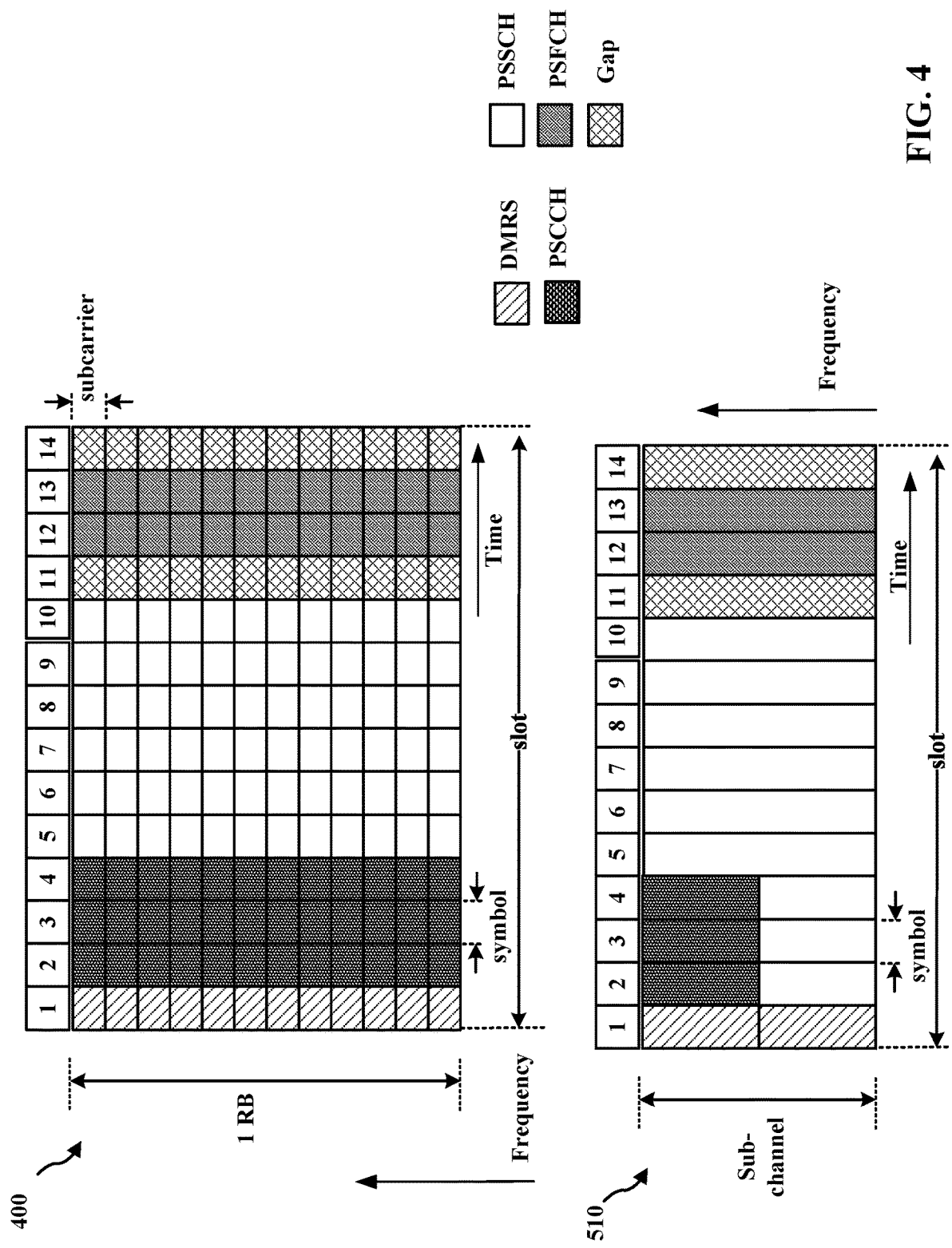
FIG. 4 is a diagram illustrating example aspects of a sidelink slot structure.

FIG. 4 includes diagrams 400 and 410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may comprise control information in PSCCH and some Res may comprise demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 4. Multiple slots may be aggregated together in some examples.

Figure 5A:
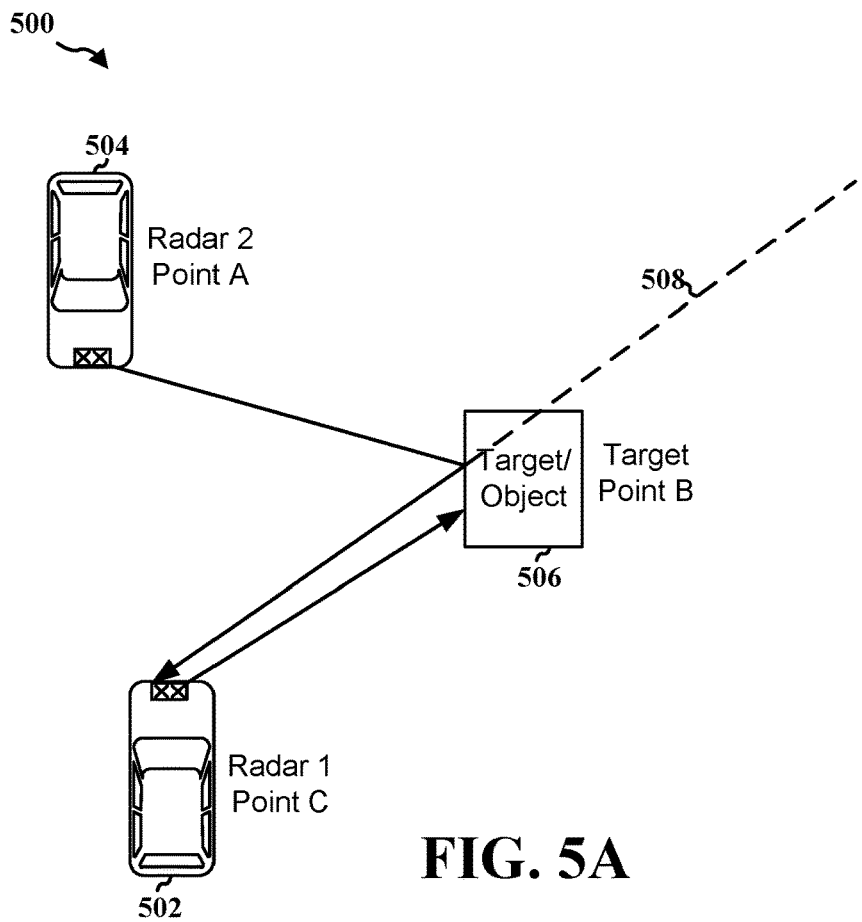
FIG. 5A is a diagram illustrating an example of radar sensing.

FIG. 5A illustrates a diagram 500 of radar sensing. The diagram 500 of FIG. 5A includes a primary radar device 502, a cooperative radar device 504 and a target device 506. The cooperative radar device 504 may be located at a point A, the target device 506 may be located at a point B, and the primary radar device 502 may be located at a point C.

In some instances, the radar image of the target device 506 may not be ideal. For example, the primary radar device 502 may not be able to completely discern the outline of the target device 506 if the primary radar device 502 is utilizing a monostatic radar image. However, utilizing the cooperative radar device 504 along with the primary radar device 502, the primary radar device 502 may have a better idea of the target outline. The primary radar device 502 having a better idea of the target outline allows the primary radar device 502 to perform an improved target classification, which may also allow for an enhanced collision avoidance. Cooperative radar sensing may assist in detecting targets or obstacles that may be in the proximity of the primary radar device 502. For example, cooperative radar sensing may assist in determining or identifying obstacles (e.g., buildings) that may block light of sight coverage, radar blind spots, out of maximum detectable range, or interference. Cooperative radar sensing may assist in providing diversity in measurements, which in some instances may lead to an enhanced opportunistic rich communication services (RCS), or densified point clouds.

The combination of the cooperative radar device 504 and the primary radar device 502 allows for a bistatic radar scenario. The primary radar device 502 may measure the delay from point A to point C. For example, at a time t1, the cooperative radar device 504 may transmit a signal, and the signal propagates at the speed of light. The signal hits the target device 506 at point B, then bounces to point C to the primary radar device 502. The primary radar device 502 receives the signal at a time t2. For example, the primary radar device 502 measures the delay t2−t1 from point A to point B to point C, such that the primary radar device 502 knows |AB|+|BC|=c(t2−t1), where the cooperative radar device 504 transmits at time t1 and the primary radar device 502 receives the transmission at time t2. This time difference or delta multiplied by the speed of light results in the distance between point A and point B and the distance between point B and point C. The primary radar device 502 may also measure the angle of arrival of the signal that bounced off the target device 506, such that the primary radar device 502 is aware that the target device 506 is somewhere along the line 508. There is only one point (e.g., point B) on the line 508 that generates the measurement |AB|+|BC|. If the primary radar device 502 knows the location of the cooperative radar device 504, then the primary radar device 502 may determine a point along the line 508, such that the sum of the distance from point along the line 508 to the cooperative radar device 504 and to the primary radar device 502 is the calculated total distance, based on the speed of light multiplied by the time delta. The primary radar device 502 may then determine the location of the target device 506.

However, in order for the primary radar device 502 to precisely determine the location of the target device 506, timing synchronization between the primary radar device 502 and the cooperative radar device 504 allows for the timing delay (e.g., t2−t1) between the cooperative radar device 504 and the primary radar device 502 to be accurately calculated. Inaccurate timing synchronization between the primary radar device 502 and the cooperative radar device 504 may result in the primary radar device 502 improperly calculating the location of the target device 506.

Figure 5B:
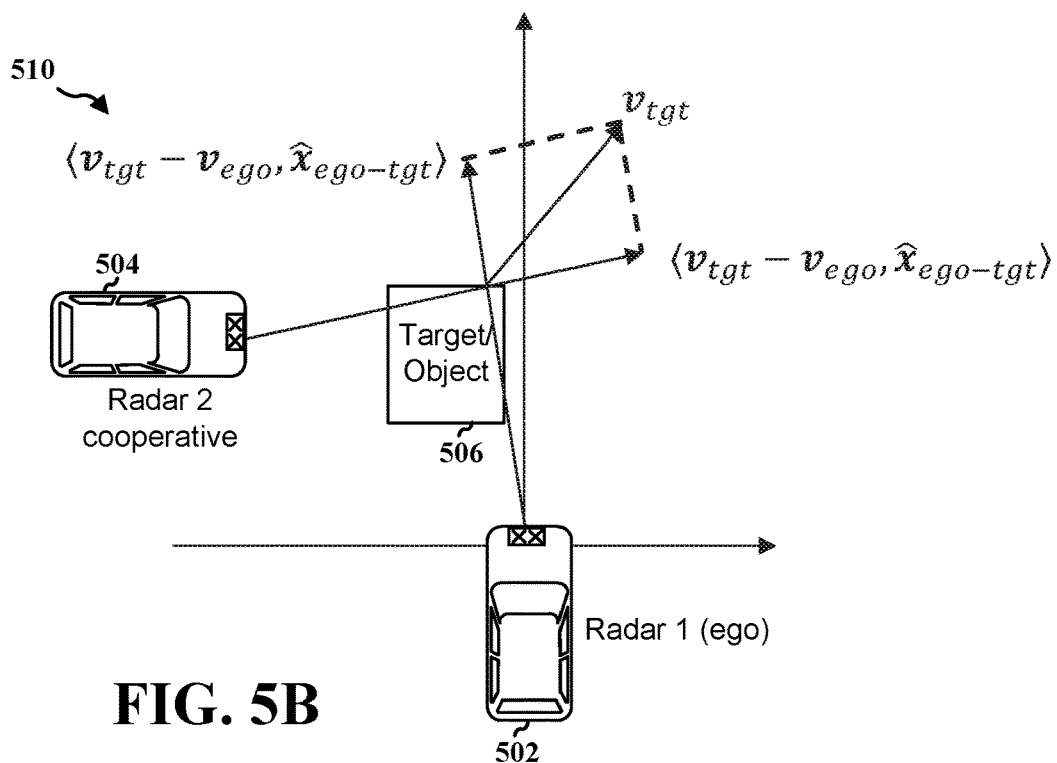
FIG. 5B is a diagram illustrating an example of velocity estimation.

FIG. 5B illustrates a diagram 510 of velocity sensing. The example of cooperative radar sensing, as discussed above in FIG. 5A, may also be utilized for velocity estimation. Cooperative radar sensing may allow for a one-shot velocity estimation. Standalone radar may estimate velocity projected onto a radial direction, e.g., $\langle v_{tgt} - v_{ego}, \hat{x}_{ego\text{-}tgt}\rangle$. However, cooperative radar sensing may estimate velocity based on $\langle v_{tgt} - v_{ego}, \hat{x}_{ego\text{-}tgt}\rangle + \langle v_{tgt} - v_{coo}, \hat{x}_{ego\text{-}coo}\rangle$. These two equations may include the unknown variables of ($v_{tgt,x}$ and $v_{tgt,y}$). These variables may be solved in instances where the primary radar device 502, the cooperative radar device 504, and the target 506 are not co-linear. The variables may be solved based on the following equations:

$$\langle v_{tgt} - v_{ego}, \hat{x}_{ego\text{-}tgt}\rangle = \text{meas}_1 \qquad (1)$$

$$\langle v_{tgt} - v_{ego}, x_{ego\text{-}tgt}\rangle + \langle v_{tgt} - v_{coo}, x_{ego\text{-}coo}\rangle = \text{meas}_2 \qquad (2)$$

where $v_{ego}$ is the velocity of the primary radar device 502, $v_{coo}$ is the velocity of the cooperative radar device 504, and $v_{tgt}$ is the velocity of the target device 506. The first measurement (e.g., $\text{meas}_1$) may be based on the standalone radar velocity estimation, while the second measurement (e.g., meas$_2$) may be based on the cooperative radar sensing velocity estimation.

In some instances, such as when $v_{ego}=v_{coo}=0$, the combination of the first and second measurements may derive the resultant vector $v_{tgt}$ which may yield the velocity estimation of the target device 506.

In some instances, radial velocity measurements from the cooperative radar sensing may be applied to tracking.

Aspects provided herein provide a configuration for timing synchronization for cooperative radar sensing. For example, a first wireless device may determine a location of a target device based at least on one or more transmissions from a second wireless device and a timing offset between the first and second wireless devices.

FIG. 6A illustrates a diagram 600 of a line of sight scenario of radar sensing, while FIG. 6B illustrates a diagram 620 of a non-line of sight scenario. The diagrams 600, 620 include a first wireless device 602 (e.g., primary radar device) at a point A, and a second wireless device 604 (e.g., cooperative radar device) at a point B. In some instances, the first wireless device 602 may know its own location and that of the second wireless device 604. In some instances, the first wireless device may know the location of reference targets, or may know the relative distance between cooperative radar pairs, or between radar and reference targets. The first wireless device 602 may know the location of other device through GPS, vehicle to anything (V2X), or through radar ranging/tracking. The first wireless device 602 may estimate a timing offset, or may simultaneously compensate timing offsets for other targets.

In some aspects, for example in a line of sight scenario, the second wireless device 604 may inform the first wireless device 602 of a transmission at time $t_1$, where an actual transmission time is $t_1'=t_1+\Delta t_1$. The first wireless device 602 may receive the transmission from the second wireless device 604 at time $t_2$, where $t_2=t_2'-\Delta t_2$. The time $t_1$ and the time $t_2$ may each be perceived time of a respective individual clock for each of the second wireless device 604 and the first wireless device 602. The time $t_1'$ and the time $t_2'$ may be an actual time with respect to a clock common to both the first wireless device and the second wireless device. Assuming that the first wireless device 602 knows the distance between the first wireless device 602 and the second wireless device 604 (e.g., length |AB|), then $$t_1 + \Delta t_1 + \frac{|AB|}{c} = t_2' = t_2 + \Delta t_2.$$

The timing offset $\Delta$ may be defined as $$\Delta = (t_2 - t_1) - (t_2' - t_1')$$
$$= \Delta t_1 - \Delta t_2 = (t_2 - t_1) - \frac{|AB|}{c}.$$

The diagram 620 of FIG. 6B is directed to a non-line of sight scenario. The diagram 620 further includes a reference object 606 at a point C and an obstacle 608. The obstacle 608 is between the first wireless device 602 and the second wireless device 604, such that the first wireless device 602 does not have a clear line of sight connection with the second wireless device 604. In such instances, the second wireless device 604 may inform the first wireless device 602 of a transmission at a time t1. The actual time that the transmission may occur at the second wireless device 604 may be $t_1'=t_1+\Delta t_1$. The first wireless device 602 may receive the transmission at a time $t_2$, where $t_2=t_2'-\Delta t_2$. Assuming that the first wireless device 602 knows the distance between the second wireless device 604 and the reference object 606 (e.g., |BC|) and the distance between the reference object 606 and the first wireless device 602 (e.g., |AC|), then $$t_1 + \Delta t_1 + \frac{|AB| + |BC|}{c} = t_2' = t_2 + \Delta t_2.$$

The timing offset $\Delta$ may be defined as $$\Delta = (t_2 - t_1) - (t_2' - t_1')$$
$$= \Delta t_1 - \Delta t_2 = (t_2 - t_1) - \frac{|AB| + |BC|}{c}.$$

Figures 7A, 7B:
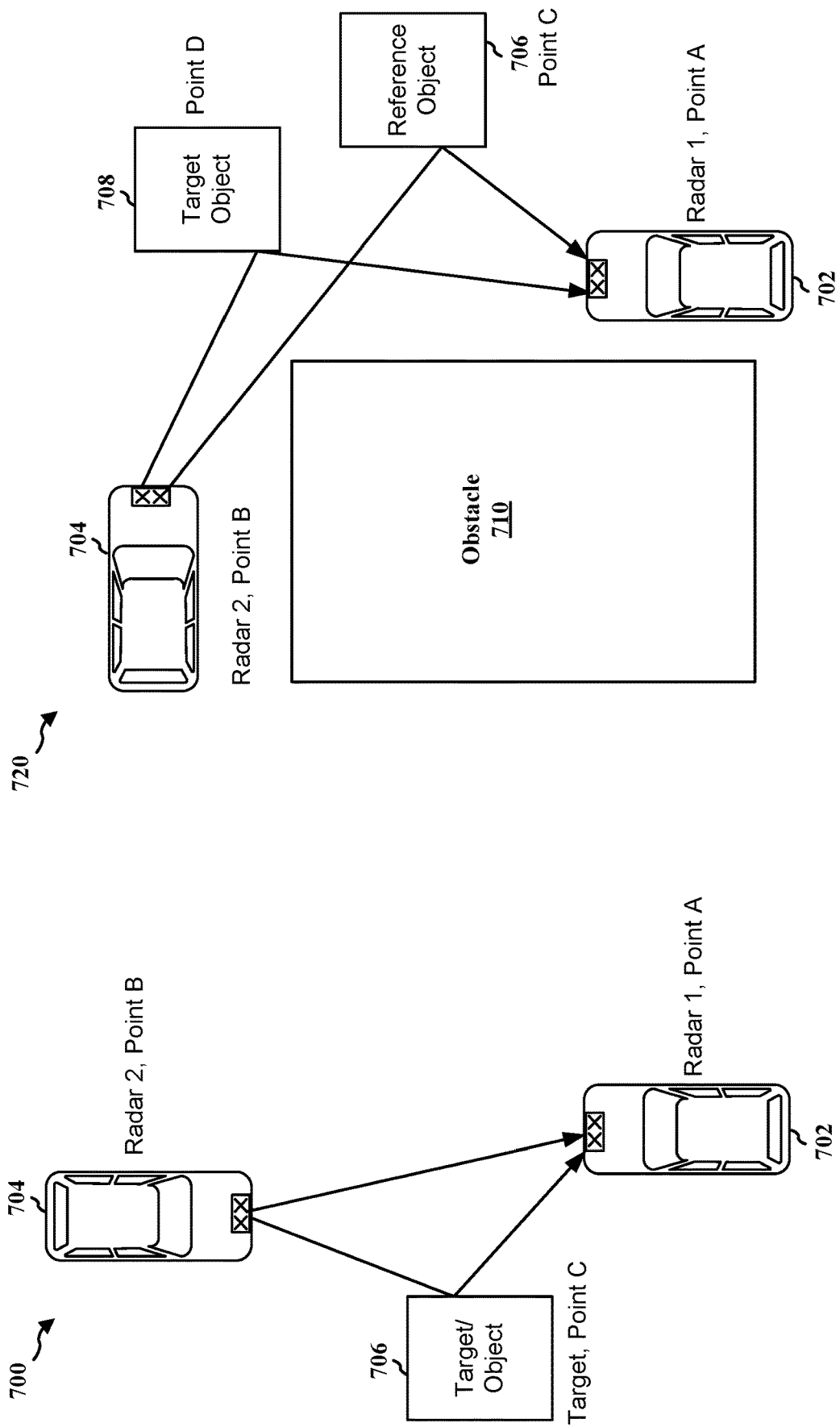
FIG. 7A is a diagram illustrating an example of timing offset and radar sensing.
FIG. 7B is a diagram illustrating an example of timing offset and radar sensing.

FIG. 7A illustrates a diagram 700 of timing offset and radar sensing in a line of sight scenario, while FIG. 7B illustrates a diagram 720 of timing offset and radar sensing in a non-line of sight scenario. The diagrams 700, 720 include a first wireless device 702 (e.g., primary radar device) at a point A and a second wireless device 704 (e.g., cooperative radar device) at a point B. The diagram 700 includes a target object 706 at a point C. The target object 706 may include another radar device, a UE, or other wireless device. The diagram 720 further includes a reference object 706 at a point C, a target object 708 at point D, and an obstacle 710. The obstacle 710 is between the first wireless device 702 and the second wireless device 704, such that the first wireless device 702 does not have a clear line of sight connection with the second wireless device 704. The first wireless device 702 and the second wireless device 704 of FIGS. 7A and 7B are configured similarly to the first wireless device 602 and the second wireless device 604 of FIGS. 6A and 6B.

With reference to FIG. 7A, the first wireless device 702 may perform a timing offset calculation and a cooperative sensing procedure. In some aspects, the first wireless device 702 may perform the timing offset calculation and the cooperative sensing procedure simultaneously. The first wireless device 702 performs the timing offset calculation and the cooperative sensing procedure simultaneously based on one transmission from the second wireless device 702 (e.g., cooperative radar device). In some aspects, the first wireless device 702 may perform the timing offset calculation and the cooperative sensing procedure separately using at least two transmissions from the second wireless device 702 (e.g., cooperative radar device).

In some aspects, for example in the line of sight scenario of FIG. 7A, the first wireless device 702 calculates the timing offset $\Delta$ as discussed above in FIG. 6A. The first wireless device 702 may receive a reflection of a transmission from the second wireless device 704 from the target object 706. The first wireless device 702 may receive the reflection from the target object 706 at a time $t_3$, where $t_3$ is the perceived time of the first wireless device 702. The first wireless device 702 may compensate for the timing difference of the time $t_3$ and the time $t_1$ (e.g., perceived time of transmission from the second wireless device 704). The first wireless device 702 may compensate for the timing difference based on the same timing offset $\Delta$. The first wireless device 702 may compensate for the timing difference regardless of the location of the target object 706. With the target object 706 being at point C, the distance of point C to point A plus the distance of point C to point B is equal to the propagation time delay multiplied by the speed of light, such that the first wireless device may estimate the distance as |BC|+|CA|=c($t_3$−$t_1$−Δ). Once this total distance is calculated, it is uncompensated, the first wireless device 702 knows the direction of the target object 706 and may determine the location of the target object 704 along the direction of the target object 706.

In some aspects, for example in the non-line of sight scenario of FIG. 7B, the first wireless device 702 calculates the timing offset Δ as discussed above in FIG. 6B. To calculate the timing offset Δ, the first wireless device 702 uses the reception of a reflection of a transmission from the second wireless device 704 from a reference object 706. In some aspects, a transmission from the second wireless device 702 bounces off the actual target (e.g., target object 708 at point D) and the first wireless device 702 may determine the direction of the target object 708, due to the angle of arrival, but does not know which point along the direction of the target object 708 that the target object 708 is located. The first wireless device 702 may determine the location of the target object 708 by estimating the total distance from point B to point D and from point D to point A. This can be performed by multiplying the propagation delay by the speed of light, with the propagation delay being compensated for timing offset. As such, the first wireless device 702 may estimate the distance as |BD|+|DA|=c($t_3$−$t_1$−Δ), where $t_3$ is the time that the reflection from the target object 708 is received by the first wireless device 702. The first wireless device 702 determining the total distance of the propagation of the reflected transmission allows the first wireless device 702 to determine the location of the target object 708 along the direction that provides the total distance.

Figure 8:
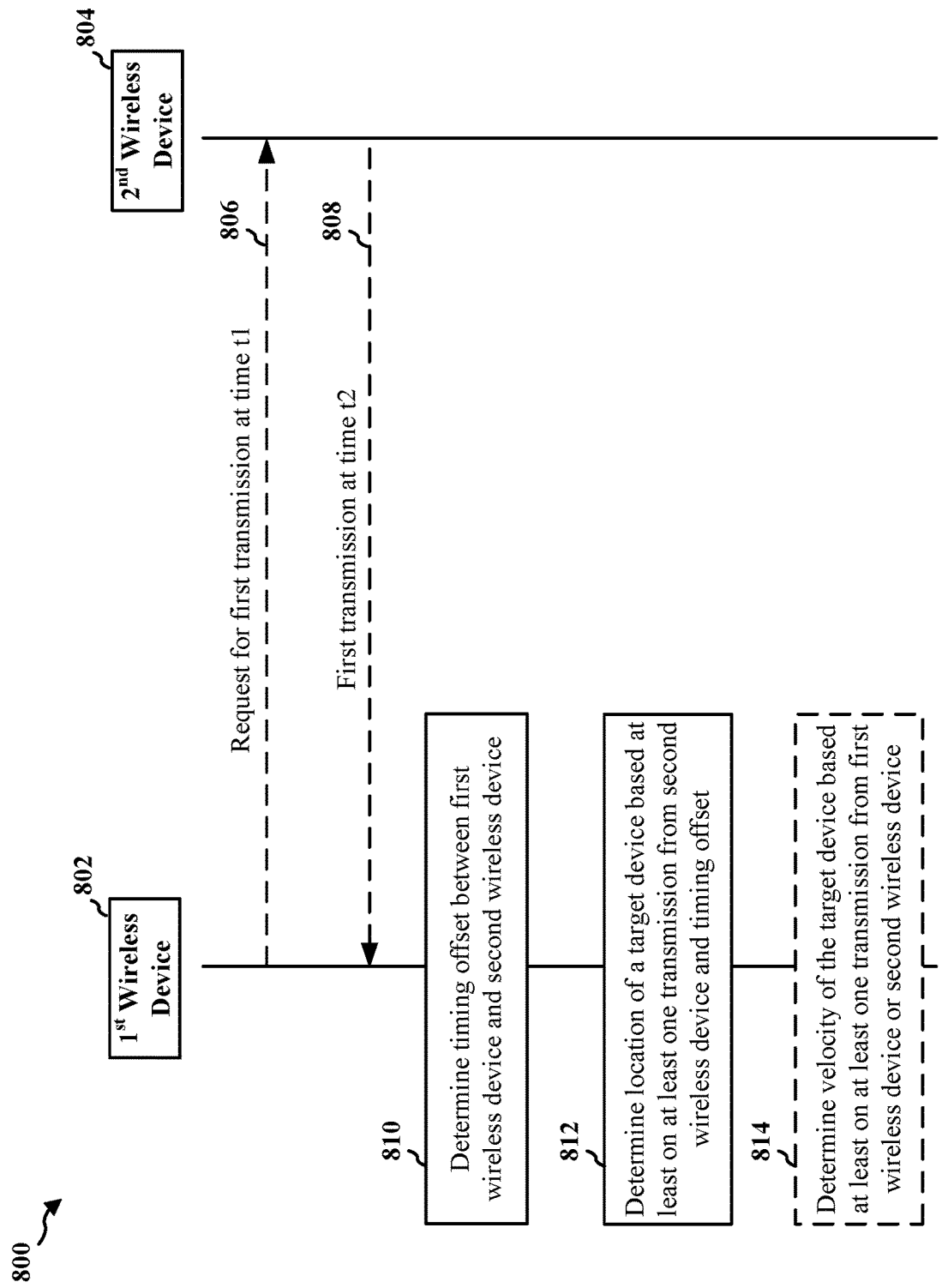
FIG. 8 is a call flow diagram of signaling between a first wireless device and a second wireless device.

FIG. 8 is a call flow diagram 800 of signaling between a first wireless device 802 and a second wireless device 804. The first wireless device 802 or the second wireless device 804 may correspond to at least UE 104. The first wireless device 802 or the second wireless device 804 may be a radar device. Optional aspects are illustrated with a dashed line.

In some aspects, for example as illustrated at 806, the first wireless device 802 the first wireless device may transmit, to the second wireless device 804, a request for a first transmission from the second wireless device at a time $t_1$. The second wireless device 804 may receive the request for the first transmission from the first wireless device 802.

In some aspects, for example as illustrated at 808, the second wireless device 804 may transmit the first transmission to the first wireless device 802 in response to the request from the first wireless device 802. The first wireless device 802 may receive the first transmission from the second wireless device.

As illustrated at 810, the first wireless device 802 determines a timing offset between the first wireless device 802 and the second wireless device 804. The first wireless device 802 may determine the timing offset between the first wireless device 802 and the second wireless device 804 based on at least one transmission received from the second wireless device 804. To determine the timing offset, the first wireless device 802 may transmit, to the second wireless device 804, the request for a first transmission from the second wireless device 804 at a time $t_1$. The first wireless device 802 may receive, from the second wireless device 804, the first transmission at a time $t_2$ in response to the request. The time $t_1$ is based on a time $t_1'$ and a first offset time $Δt_1$, such that the second wireless device 804 transmits the first transmission at $t_1'$. The time $t_2$ is based on a time $t_2'$ and a second offset time Δt2. The time $t_1'$ and the time $t_2'$ may be an actual time with respect to a clock common to both the first wireless device 802 and the second wireless device 804. The time $t_1$ and the time $t_2$ may each be perceived time of a respective individual clock for each of the second wireless device 804 and the first wireless device 802. In some aspects, the timing offset may be based at least on a difference between a perceived time $t_2$ and the time $t_1$ and a propagation time between the first wireless device 802 and the second wireless device 804. In some aspects, the first wireless device 802 may be configured to obtain positional information of its own location and a location of the second wireless device 804. The first wireless device 802 may obtain the positional information of its own location or the location of the second wireless device 804 via GPS, V2X communications, or radar ranging or tracking.

In some aspects, a line of sight link may be present between the first wireless device 802 and the second wireless device 804. In some aspects, a line of sight link may not be present between the first wireless device 802 and the second wireless device 804. The first wireless device 802 may receive the first transmission at the time $t_2$ based on a reflection of the first transmission at a reference point between the first wireless device 802 and the second wireless device 804. In some aspects, the time $t_1$ may be based on a time $t_1'$ and a first offset time $Δt_1$, such that the second wireless device 804 transmits the first transmission at $t_1$. In some aspects, the time $t_2$ may be based on a time $t_1'$ and a second offset time $Δt_2$. The timing offset may be based at least on a difference between a perceived time $t_2$ and the time $t_1$ and a propagation time between the first wireless device 802, the second wireless device 804, and the reference point.

As illustrated at 812, the first wireless device 802 may determine a location of a target source. The first wireless device 802 may determine the location of the target device based at least on the at least one transmission from the second wireless device 804 and the timing offset between the first wireless device 802 and the second wireless device 804. In some aspects, at least one transmission received from the second wireless device 804 comprises a plurality of transmissions. A first transmission received from the second wireless device 804 may be utilized by the first wireless device 802 to determine the timing offset. A second transmission received from the second wireless device 804 may be utilized by the first wireless device 802 to determine the location of the target device. In some aspects, the first wireless device 802 may perform a radar sensing procedure using the second transmission received from the second wireless device 804 to determine the location of the target device. In some aspects, the at least one transmission comprises a single transmission. In such aspects, the single transmission received from the second wireless device 804 may be utilized by the first wireless device 802 to determine the timing offset and to determine the location of the target device.

In some aspects, for example as illustrated at 814, the first wireless device 802 may determine a velocity of the target device based at least on at least one transmission from the first wireless device or the second wireless device. In some aspects, a first measurement may be measured based on at least one transmission from the first wireless device. The first measurement may be measured to determine a first component of the velocity of the target device. The first wireless device may measure the first measurement by using a standalone radar sensing procedure. For example, the standalone radar sensing procedure may comprise at least one transmission from the first wireless device that estimates velocity projected onto a radial direction, e.g., $\langle v_{tgt}-v_{ego}, \hat{x}_{ego-tgt}\rangle$. In some aspects, a second measurement may be measured based on at least one transmission from the first wireless device and at least one transmission from the second wireless device. The second measurement may be measured to determine a second component of the velocity of the target device. The first wireless device may measure the second measurement by using a cooperative radar sensing procedure. For example, the cooperative radar sensing procedure may comprise at least one transmission from the first wireless device and at least one transmission from the second wireless device that estimates velocity projected onto a radial direction, e.g., $\langle v_{tgt}-v_{ego}, \hat{x}_{ego-tgt}\rangle + \langle v_{tgt}-v_{coo}, \hat{x}_{ego-coo}\rangle$. The velocity of the target device may be determined based on the first measurement and the second measurement, in instances where the first wireless device, the second wireless device, and the target device are not co-linear.

Figure 9:
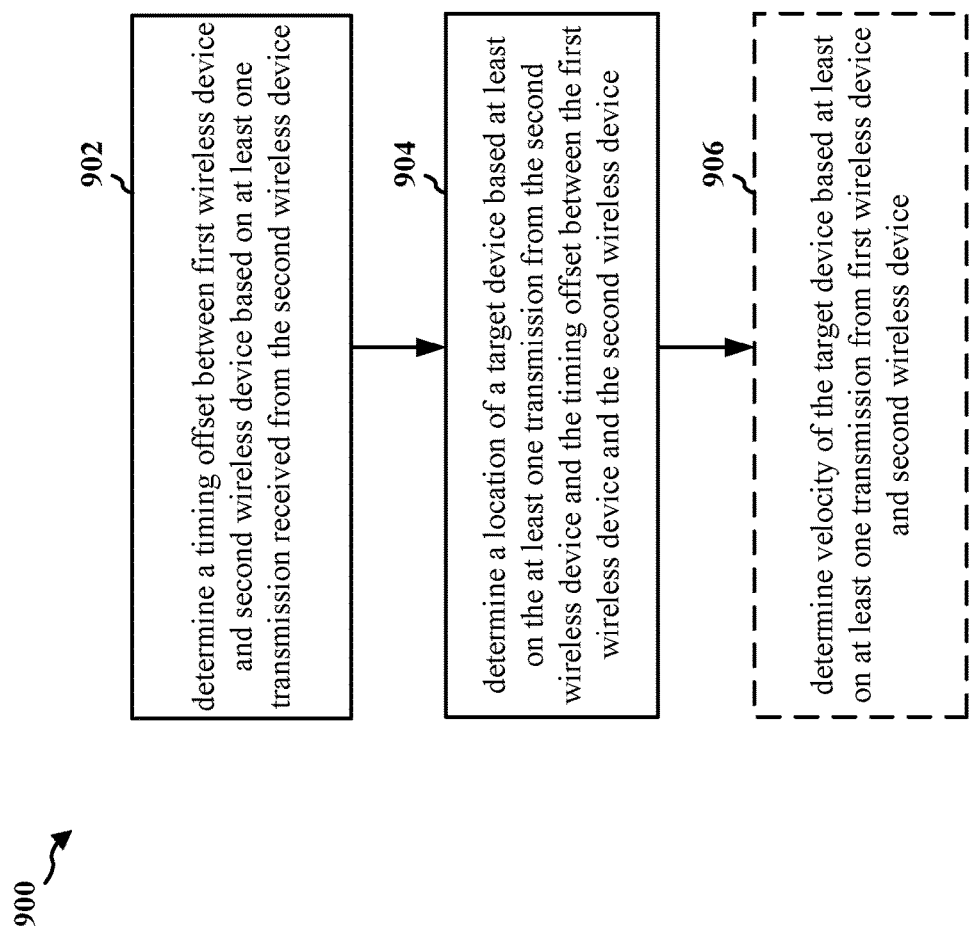
FIG. 9 is a flowchart of a method of wireless communication at a wireless device.

FIG. 9 is a flowchart 900 of a method of wireless communication at a wireless device. The wireless device may be the radar device 103; the UE 104; the vehicle 104; and/or an apparatus 1002 (e.g., a vehicular radar or a non-vehicular radar). One or more of the illustrated operations may be omitted, transposed, or contemporaneous. Optional aspects are illustrated with a dashed line. The method may be performed to determine a timing offset between a first wireless device and a second wireless device in order to synchronize timing between the first wireless device and the second wireless device.

At 902, the first wireless device determines a timing offset between the first wireless device and a second wireless device. For example, 902 may be performed by offset component 1040 of apparatus 1002. The first wireless device may determine the timing offset between the first wireless device and the second wireless device based on at least one transmission received from the second wireless device. In some aspects, to determine the timing offset, the first wireless device may transmit, to the second wireless device, a request for a first transmission from the second wireless device at a time $t_1$. The first wireless device may receive, from the second wireless device, the first transmission at a time $t_2$ in response to the request. The time $t_1$ is based on a time $t_1$ and a first offset time $\Delta t_1$, such that the second wireless device transmits the first transmission at $t_1'$. The time $t_2$ is based on a time $t_2'$ and a second offset time $\Delta t_2$. The time $t_1'$ and the time $t_2'$ may be an actual time with respect to a clock common to both the first wireless device and the second wireless device. The time $t_1$ and the time $t_2$ may each be perceived time of a respective individual clock for each of the second wireless device and the first wireless device. In some aspects, the timing offset may be based at least on a difference between a perceived time $t_2$ and the time $t_1$ and a propagation time between the first wireless device and the second wireless device. In some aspects, the first wireless device may be configured to obtain positional information of its own location and a location of the second wireless device. The first wireless device may obtain the positional information of its own location or the location of the second wireless device via GPS, V2X communications, or radar ranging or tracking.

In some aspects, a line of sight link may be present between the first wireless device and the second wireless device. In some aspects, a line of sight link may not be present between the first wireless device and the second wireless device. The first wireless device may receive the first transmission at the time $t_2$ based on a reflection of the first transmission at a reference point between the first wireless device and the second wireless device. In some aspects, the time t1 may be based on a time $t_1'$ and a first offset time $\Delta t_1$, such that the second wireless device transmits the first transmission at $t_1$. In some aspects, the time $t_2$ may be based on a time $t_2'$ and a second offset time $\Delta t_2$. The timing offset may be based at least on a difference between a perceived time $t_2$ and the time $t_1$ and a propagation time between the first wireless device, the second wireless device, and the reference point.

At 904, the first wireless device determines a location of a target device. For example, 904 may be performed by location component 1042 of apparatus 1002. The first wireless device may determine the location of the target device based at least on the at least one transmission from the second wireless device and the timing offset between the first wireless device and the second wireless device. In some aspects, at least one transmission received from the second wireless device comprises a plurality of transmissions. A first transmission received from the second wireless device may be utilized by the first wireless device to determine the timing offset. A second transmission received from the second wireless device may be utilized by the first wireless device to determine the location of the target device. In some aspects, the first wireless device may perform a radar sensing procedure using the second transmission received from the second wireless device to determine the location of the target device. In some aspects, the at least one transmission comprises a single transmission. In such aspects, the single transmission received from the second wireless device may be utilized by the first wireless device to determine the timing offset and to determine the location of the target device.

In some aspects, for example at 906, the first wireless device may determine a velocity of the target device based at least on at least one transmission from the first wireless device or the second wireless device. For example, 906 may be performed by velocity component 1044 of apparatus 1002. In some aspects, a first measurement may be measured based on at least one transmission from the first wireless device. The first measurement may be measured to determine a first component of the velocity of the target device. The first wireless device may measure the first measurement by using a standalone radar sensing procedure. For example, the standalone radar sensing procedure may comprise at least one transmission from the first wireless device that estimates velocity projected onto a radial direction, e.g., $\langle v_{tgt}-v_{ego}, \hat{x}_{ego-tgt}\rangle$. In some aspects, a second measurement may be measured based on at least one transmission from the first wireless device and at least one transmission from the second wireless device. The second measurement may be measured to determine a second component of the velocity of the target device. The first wireless device may measure the second measurement by using a cooperative radar sensing procedure. For example, the cooperative radar sensing procedure may comprise at least one transmission from the first wireless device and at least one transmission from the second wireless device that estimates velocity projected onto a radial direction, e.g., $\langle v_{tgt}-v_{ego}, x_{ego-tgt}\rangle + \langle v_{tgt}-v_{coo}, \hat{x}_{ego-coo}\rangle$. The velocity of the target device may be determined based on the first measurement and the second measurement, in instances where the first wireless device, the second wireless device, and the target device are not co-linear.

Figure 10:
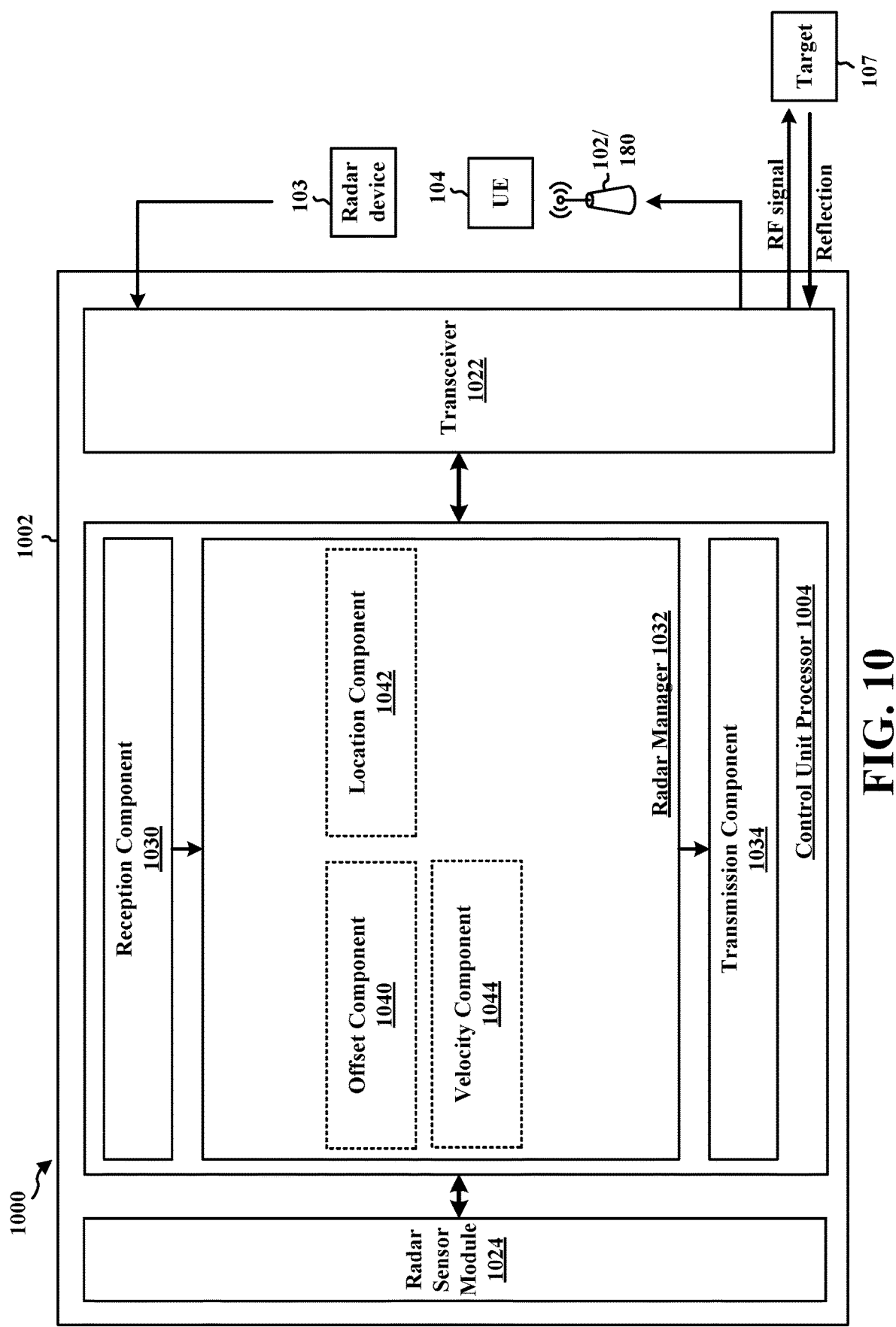
FIG. 10 is a diagram illustrating an example of a hardware implementation for an example apparatus.

FIG. 10 is a diagram 1000 illustrating an example of a hardware implementation for an apparatus 1002. The apparatus 1002 is a radar signal sensing device and includes an RF baseband processor 1004 (also referred to as a modem) coupled to an RF transceiver 1022. In some examples, the apparatus may be capable of wireless communication in addition to radar signal sensing. For example, the apparatus may be a radar device, a UE, a base station, or another access point that is capable of radar signal sensing. If the radar signal sensing device is a UE, the processor may be coupled to one or more subscriber identity modules (SIM) cards, an application processor coupled to a secure digital (SD) card and a screen, a Bluetooth module, a wireless local area network (WLAN) module, a Global Positioning System (GPS) module, a power supply, etc. The control unit processor 1004 communicates through the RF transceiver 1022 with the UE 104 and/or BS 102/180. The control unit processor 1004 may include a computer-readable medium/ memory. The computer-readable medium/memory may be non-transitory. The control unit processor 1004 is responsible for general processing, including the execution of software stored on the computer-readable medium/memory. The software, when executed by the control unit processor 1004, causes the control unit processor 1004 to perform the various functions described supra. The computer-readable medium/memory may also be used for storing data that is manipulated by the control unit processor 1004 when executing software. The control unit processor 1004 further includes a reception component 1030, a radar manager 1032, and a transmission component 1034. The radar manager 1032 includes the one or more illustrated components. The components within the radar manager 1032 may be stored in the computer-readable medium/memory and/or configured as hardware within the control unit processor 1004. The control unit processor 1004 may be a component of the wireless device 350 and may include the memory 360 and/or at least one of the TX processor 368, the RX processor 356, and the controller/processor 359. In one configuration, the apparatus 1002 may be a modem chip and include just the control unit processor 1004, and in another configuration, the apparatus 1002 may be an entire RF sensing device (e.g., radar device 103) or an entire UE (e.g., UE 104) and include the additional modules of the apparatus 1002.

The radar manager 1032 may include an offset component 1040 that is configured to determine a timing offset between the first wireless device and a second wireless device, e.g., as described in connection with 902 in FIG. 9. The radar manager 1032 may further include a location component 1042 that is configured to determine a location of a target device, e.g., as described in connection with 904 in FIG. 9. The radar manager 1032 may further include a velocity component 1044 that is configured to determine a velocity of the target device based at least on at least one transmission from the first wireless device or the second wireless device, e.g., as described in connection with 906 of FIG. 9.

The apparatus 1002 may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the control unit processor 1004, includes means for determining a timing offset between the first wireless device and a second wireless device based on at least one transmission received from the second wireless device. The apparatus includes means for determining a location of a target device based at least on the at least one transmission from the second wireless device and the timing offset between the first wireless device and the second wireless device. The apparatus, to determine the timing offset may be configured to transmit, to the second wireless device, a request for a first transmission from the second wireless device at a time t1. The apparatus, to determine the timing offset may be configured to receive, from the second wireless device, the first transmission at a time t2 in response to the request. The aforementioned means may be one or more of the aforementioned components of the apparatus 1002 configured to perform the functions recited by the aforementioned means. As described supra, the apparatus 1002 may include the TX Processor 368, the RX Processor 356, and the controller/ processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following example aspects are illustrative only and may be combined with other aspects or teachings described herein, without limitation.

Aspect 1 is a method of wireless communication at a first wireless device comprising determining a timing offset between the first wireless device and a second wireless device based on at least one transmission received from the second wireless device; and determining a location of a target device based at least on the at least one transmission from the second wireless device and the timing offset between the first wireless device and the second wireless device.

In Aspect 2, the method of Aspect 1 further includes that the determining the timing offset further includes transmitting, to the second wireless device, a request for a first transmission from the second wireless device at a time $t_1$; and receiving, from the second wireless device, the first transmission at a time $t_2$ in response to the request.

In Aspect 3, the method of Aspect 1 or 2 further includes that the time $t_1$ is based on a time $t_1'$ and a first offset time $\Delta t_1$, such that the second wireless device transmits the first transmission at $t_1'$.

In Aspect 4, the method of any of Aspects 1-3 further includes that the time t2 is based on a time $t_2'$ and a second offset time $\Delta t_2$.

In Aspect 5, the method of any of Aspects 1-4 further includes that the time $t_1'$ and the time $t_2'$ are an actual time with respect to a clock common to both the first wireless device and the second wireless device, wherein the time $t_1$ and the time $t_2$ are each perceived time of a respective individual clock for each of the second wireless device and the first wireless device.

In Aspect 6, the method of any of Aspects 1-5 further includes that the timing offset is based at least on a difference between a perceived time $t_2$ and the time $t_1$ and a propagation time between the first wireless device and the second wireless device.

In Aspect 7, the method of any of Aspects 1-6 further includes that the first wireless device is configured to obtain positional information of its own location and a location of the second wireless device.

In Aspect 8, the method of any of Aspects 1-7 further includes that the first wireless device obtains the positional information of its own location or the location of the second wireless device via GPS, V2X communications, or radar ranging or tracking.

In Aspect 9, the method of any of Aspects 1-8 further includes that a line of sight link is present between the first wireless device and the second wireless device.

In Aspect 10, the method of any of Aspects 1-9 further includes that a line of sight link is not present between the first wireless device and the second wireless device, wherein the first wireless device receives the first transmission at the time $t_2$ based on a reflection of the first transmission at a reference point between the first wireless device and the second wireless device.

In Aspect 11, the method of any of Aspects 1-10 further includes that the time $t_1$ is based on a time $t_1'$ and a first offset time $\Delta t_1$, such that the second wireless device transmits the first transmission at $t_1$.

In Aspect 12, the method of any of Aspects 1-11 further includes that the time $t_2$ is based on a time $t_2'$ and a second offset time $\Delta t_2$.

In Aspect 13, the method of any of Aspects 1-12 further includes that the timing offset is based at least on a difference between a perceived time $t_2$ and the time $t_1$ and a propagation time between the first wireless device, the second wireless device, and the reference point.

In Aspect 14, the method of any of Aspects 1-13 further includes that the at least one transmission received from the second wireless device comprises a plurality of transmissions, wherein a first transmission received from the second wireless device is utilized by the first wireless device to determine the timing offset, and a second transmission received from the second wireless device is utilized by the first wireless device to determine the location of the target device.

In Aspect 15, the method of any of Aspects 1-14 further includes that the first wireless device performs a radar sensing procedure using the second transmission received from the second wireless device to determine the location of the target device.

In Aspect 16, the method of any of Aspects 1-15 further includes that the at least one transmission comprises a single transmission, wherein the single transmission received from the second wireless device is utilized by the first wireless device to determine the timing offset and to determine the location of the target device.

In Aspect 17, the method of any of Aspects 1-16 further includes determining a velocity of the target device based at least on at least one transmission from the first wireless device or the second wireless device.

In Aspect 18, the method of any of Aspects 1-17 further includes that a first measurement is measured based on at least one transmission from the first wireless device and determines a first component of the velocity of the target device using a standalone radar sensing procedure.

In Aspect 19, the method of any of Aspects 1-18 further includes that a second measurement is measured based on at least one transmission from the first wireless device and at least one transmission from the second wireless device and determines a second component of the velocity of the target device using a cooperative radar sensing procedure.

In Aspect 20, the method of any of Aspects 1-19 further includes that the velocity of the target device is determined based on the first measurement and the second measurement, wherein the first wireless device, the second wireless device, and the target device are not co-linear.

Aspect 21 is a device including one or more processors and one or more memories in electronic communication with the one or more processors and storing instructions executable by the one or more processors to cause the device to implement a method as in any of Aspects 1-20.

Aspect 22 is a system or apparatus including means for implementing a method or realizing an apparatus as in any of Aspects 1-20.

Aspect 23 is a non-transitory computer readable storage medium storing instructions executable by one or more processors to cause the one or more processors to implement a method as in any of Aspect 1-20.

What is claimed is:
1. A method of wireless communication at a first wireless device, comprising:

determining a timing offset between the first wireless device and a second wireless device based on at least one transmission received from the second wireless device, wherein the timing offset is based at least on a difference between a perceived time $t_2$ associated with reception of a first transmission from the second wireless device and a time $t_1$ associated with transmission of a request for the first transmission to the second wireless device and a propagation time between the first wireless device and the second wireless device;

determining a location of a target device based at least on the at least one transmission from the second wireless device and the timing offset between the first wireless device and the second wireless device, wherein the at least one transmission from the second wireless device comprises a reflection from the target device of the at least one transmission from the second wireless device; and determining a velocity of the target device based at least on at least one transmission from the first wireless device.

2. The method of claim 1, wherein the determining the timing offset further comprises:

transmitting, to the second wireless device, the request for the first transmission from the second wireless device at the time $t_1$; and receiving, from the second wireless device, the first transmission at the time $t_2$ in response to the request.

3. The method of claim 2, wherein the time $t_1$ is based on a time $t_1'$ and a first offset time $\Delta t_1$, such that the second wireless device transmits the first transmission at $t_1'$.

4. The method of claim 3, wherein the time $t_2$ is based on a time $t_2'$ and a second offset time $\Delta t_2$.

5. The method of claim 4, wherein the time $t_1'$ and the time $t_2'$ are an actual time with respect to a clock common to both the first wireless device and the second wireless device, wherein the time $t_1$ and the time $t_2$ are each perceived time of a respective individual clock for each of the second wireless device and the first wireless device.

6. The method of claim 2, wherein the first wireless device is configured to obtain positional information of its own location and a location of the second wireless device.

7. The method of claim 6, wherein the first wireless device obtains the positional information of its own location or the location of the second wireless device via global positioning system (GPS), vehicle to anything (V2X) communications, or radar ranging or tracking.

8. The method of claim 2, wherein a line of sight link is present between the first wireless device and the second wireless device.

9. The method of claim 2, wherein a line of sight link is not present between the first wireless device and the second wireless device, wherein the first wireless device receives the first transmission at the time $t_2$ based on a reflection of the first transmission at a reference point between the first wireless device and the second wireless device.

10. The method of claim 9, wherein the time $t_1$ is based on a time $t_1'$ and a first offset time $\Delta t_1$, such that the second wireless device transmits the first transmission at $t_1$.

11. The method of claim 10, wherein the time $t_2$ is based on a time $t_2'$ and a second offset time $\Delta t_2$.

12. The method of claim 9, wherein the timing offset is based at least on a difference between the time $t_2$ and the time $t_1$ and a propagation time between the first wireless device, the second wireless device, and the reference point.

13. The method of claim 1, wherein the at least one transmission received from the second wireless device comprises a plurality of transmissions, wherein a first transmission received from the second wireless device is utilized by the first wireless device to determine the timing offset, and a second transmission received from the second wireless device is utilized by the first wireless device to determine the location of the target device.

14. The method of claim 13, wherein the first wireless device performs a radar sensing procedure using the second transmission received from the second wireless device to determine the location of the target device.

15. The method of claim 1, wherein the at least one transmission comprises a single transmission, wherein the single transmission received from the second wireless device is utilized by the first wireless device to determine the timing offset and to determine the location of the target device.

16. The method of claim 1, wherein the velocity of the target device based at least on the at least one transmission from the first wireless device or the at least one transmission from the second wireless device.

17. The method of claim 16, wherein a first measurement is measured based on at least one transmission from the first wireless device and determines a first component of the velocity of the target device using a standalone radar sensing procedure.

18. The method of claim 17, wherein a second measurement is measured based on at least one transmission from the first wireless device and the at least one transmission from the second wireless device and determines a second component of the velocity of the target device using a cooperative radar sensing procedure.

19. The method of claim 18, wherein the velocity of the target device is determined based on the first measurement and the second measurement, wherein the first wireless device, the second wireless device, and the target device are not co-linear.

20. An apparatus for wireless communication at a first wireless device, comprising:

a memory; and at least one processor coupled to the memory and configured to:

determine a timing offset between the first wireless device and a second wireless device based on at least one transmission received from the second wireless device, wherein the timing offset is based at least on a difference between a perceived time $t_2$ associated with reception of a first transmission from the second wireless device and a time $t_1$ associated with transmission of a request for the first transmission to the second wireless device and a propagation time between the first wireless device and the second wireless device;

determine a location of a target device based at least on the at least one transmission from the second wireless device and the timing offset between the first wireless device and the second wireless device, wherein the at least one transmission from the second wireless device comprises a reflection from the target device of the at least one transmission from the second wireless device; and determine a velocity of the target device based at least on at least one transmission from the first wireless device.

21. The apparatus of claim 20, wherein to determine the timing offset the at least one processor is configured to:

transmit, to the second wireless device, the request for the first transmission from the second wireless device at the time $t_1$; and receive, from the second wireless device, the first transmission at the time $t_2$ in response to the request.

22. The apparatus of claim 21, wherein the time $t_1$ is based on a time $t_1'$ and a first offset time $\Delta t1$, such that the second wireless device transmits the first transmission at $t_1'$, wherein the time $t_2$ is based on a time $t_2'$ and a second offset time $\Delta t_2$.

23. The apparatus of claim 21, wherein the first wireless device is configured to obtain positional information of its own location and a location of the second wireless device, wherein the first wireless device obtains the positional information of its own location or the location of the second wireless device via global positioning system (GPS), vehicle to anything (V2X) communications, or radar ranging or tracking.

24. The apparatus of claim 21, wherein a line of sight link is not present between the first wireless device and the second wireless device, wherein the first wireless device receives the first transmission at the time $t_2$ based on a reflection of the first transmission at a reference point between the first wireless device and the second wireless device, wherein the time $t_1$ is based on a time $t_1$ and a first offset time $\Delta t_1$, such that the second wireless device transmits the first transmission at $t_1$, wherein the time $t_2$ is based on a time $t_2'$ and a second offset time $\Delta t_2$, wherein the timing offset is based at least on a difference between a perceived time $t_2$ and the time $t_1$ and a propagation time between the first wireless device, the second wireless device, and the reference point.

25. The apparatus of claim 20, wherein the at least one transmission received from the second wireless device comprises a plurality of transmissions, wherein a first transmission received from the second wireless device is utilized by the first wireless device to determine the timing offset, and a second transmission received from the second wireless device is utilized by the first wireless device to determine the location of the target device.

26. The apparatus of claim 25, wherein the first wireless device performs a radar sensing procedure using the second transmission received from the second wireless device to determine the location of the target device, wherein the at least one transmission comprises a single transmission, wherein the single transmission received from the second wireless device is utilized by the first wireless device to determine the timing offset and to determine the location of the target device.

27. The apparatus of claim 20, wherein the velocity of the target device based at least on the at least one transmission from the first wireless device or the at least one transmission from the second wireless device.

28. An apparatus for wireless communication at a first wireless device, comprising:

means for determining a timing offset between the first wireless device and a second wireless device based on at least one transmission received from the second wireless device, wherein the timing offset is based at least on a difference between a perceived time $t_2$ associated with reception of a first transmission from the second wireless device and a time $t_1$ associated with transmission of a request for the first transmission to the second wireless device and a propagation time between the first wireless device and the second wireless device;

means for determining a location of a target device based at least on the at least one transmission from the second wireless device and the timing offset between the first wireless device and the second wireless device, wherein the at least one transmission from the second wireless device comprises a reflection from the target device of the at least one transmission from the second wireless device; and means for determining a velocity of the target device based at least on at least one transmission from the first wireless device.

29. A computer-readable medium storing computer executable code, the code when executed by a processor of a first wireless device causes the processor to:

determine a timing offset between the first wireless device and a second wireless device based on at least one transmission received from the second wireless device, wherein the timing offset is based at least on a difference between a perceived time $t_2$ associated with reception of a first transmission from the second wireless device and a time $t_1$ associated with transmission of a request for the first transmission to the second wireless device and a propagation time between the first wireless device and the second wireless device;

determine a location of a target device based at least on the at least one transmission from the second wireless device and the timing offset between the first wireless device and the second wireless device, wherein the at least one transmission from the second wireless device comprises a reflection from the target device of the at least one transmission from the second wireless device; and determine a velocity of the target device based at least on at least one transmission from the first wireless device.

\* \* \* \* \*